United States Patent [19]

Byrd et al.

[11] E Re. 29,726

[45] Reissued Aug. 8, 1978

[54] METHOD OF COATING CARBON STEEL

[75] Inventors: Fred Byrd, Lebanon; Marvin B. Pierson, Franklin; Thomas A. Compton, Middletown; Frank C. Dunbar, Monroe, all of Ohio

[73] Assignee: Armco Steel Corporation, Middletown, Ohio

[21] Appl. No.: 768,111

[22] Filed: Feb. 14, 1977

Related U.S. Patent Documents

Reissue of:

[64] Patent No.: 3,936,543
Issued: Feb. 3, 1976
Appl. No.: 499,772
Filed: Aug. 22, 1974

[51] Int. Cl.[2] ..... C23C 1/00

[52] U.S. Cl. ..... 427/320; 427/319; 427/321; 427/433

[58] Field of Search ..... 427/320, 321, 319, 433

[56] References Cited

U.S. PATENT DOCUMENTS

| | | | |
|---|---|---|---|
| 2,197,622 | 4/1940 | Sendzimir | 427/321 |
| 3,320,085 | 5/1967 | Turner | 427/321 |
| 3,383,250 | 5/1968 | Pierson et al. | 427/321 |

FOREIGN PATENT DOCUMENTS

| | | | |
|---|---|---|---|
| 1,170,057 | 11/1969 | United Kingdom | 427/321 |

*Primary Examiner*—Ralph S. Kendall
*Attorney, Agent, or Firm*—Melville, Strasser, Foster & Hoffman

[57] ABSTRACT

A method of preparing carbon steel strip and sheet for hot dip metallic coating in a Selas-type direct-fired furnace, wherein the atmosphere in the furnace is controlled to contain from about 3% oxygen to about 2% excess combustibles by volume, thereby forming a thin iron oxide film on the carbon steel surfaces. The strip and sheet is then heated in a subsequent furnace containing at least 5% hydrogen by volume at a temperature sufficient to reduce the oxide film, viz., at least about 675° C. The direct-fired furnace is preferably operated at stoichiometrically equivalent fuel:air ratios.

7 Claims, 3 Drawing Figures

METHOD OF COATING CARBON STEEL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to improvements in the process of hot dip metallic coating of carbon steel strip and sheet material with molten coating metals such as zinc, zinc alloys, aluminum, aluminum alloys and terne. More particularly, this invention relates to the preparation of carbon steel strip and sheet surfaces for coating by a preliminary treatment involving heating in a furnace heated by direct combustion of fuel and air therein and in an atmosphere containing gaseous products of combustion, under conditions which achieve optimum combustion efficiency, and optimum production rate through an increase in furnace heat input. Carbon steels which may be treated by the process of the present invention include compositions falling within the definition of carbon steel as set forth in Steel Products Manual, Carbon Sheet Steel, page 7 (May 1970), published by American Iron and Steel Institute. Coated carbon steel strip or sheet produced in accordance with the process of the invention can be produced to commercial quality, drawing quality or nonearring (normalized) quality specifications.

2. Description of the Prior Art

In the hot dip metallic coating of carbon steel strip and sheet material without a flux, it is necessary to subject the sheet and strip surfaces to a preliminary treatment which provides a clean surface free of iron oxide scale which is readily wettable by the molten coating metal and to which the coating metal will adhere after solidification thereof. Two types of in-line-anneal preliminary treatments are commonly used in this country, one being the so-called Sendzimir process (a detailed description of which may be found in U.S. Pat. No. 2,110,893, issued Mar. 15, 1938 to T. Sendzimir) and the other being the so-called Selas process (a detailed description of which may be found in U.S. Pat. No. 3,320,085, issued May 16, 1967 to C. A. Turner, Jr.).

The Sendzimir process has several disadvantages, among which are limitation on the strip preheat temperature in the open end oxidizing furnace to about 800° F in order to avoid over-oxidation, a requirement for a high strip temperature cycle in a strongly reducing atmosphere, thereby making it impossible to practice sub-critical annealing cycles; abrasive contact between the atmosphere-furnace hearth rolls and the oxidized strip which causes hearth roll pick-up and in turn causes strip dents and gouges, thereby lowering the quality of the finished product; and the necessity to provide a high hydrogen content (at least 20%) reducing furnace atmosphere, thereby increasing cost and creating a potential safety hazard. These disadvantages are substantially avoided in the Selas-type method in which surface contaminants are removed by a high-gradient, direct-fired strip heating with a complete absence of strip oxidation under conventional conditions.

The direct-fired Selas furnace is connected in sealed relation to a subsequent furnace containing a controlled atmosphere of hydrogen and nitrogen. This is advantageous in that the furnace system can be operated above atmospheric pressure by controlling the dicharge rate of the direct-fired furnace combustion products, thus eliminating the hazard of air contamination of the hydrogen and nitrogen atmosphere by small furnace leaks. In the conventional Selas-type method the following conditions must be observed.

The fuel-to-air ratio must be regulated to produce at least about 3% excess combustibles, by volume, in the furnace atmosphere.

According to the above-mentioned Turner patent a substantial difference between the furnace temperature and the maximum strip temperature must be maintained, i.e. the furnace temperature is maintained above about 1315° C (2400° F) and the maximum strip temperature is not allowed to exceed about 760° C (1400° F) or a critical strip temperature value. In actual commercial practice furnace temperatures of about 1205° C(2200° F) and higher are now commonly used.

Since the atmosphere of gaseous products of combustion in the direct-fired Selas furnace is reducing to carbon steel under dynamic strip heating conditions, hydrogen contents of 5% or less by volume are adequate in the subsequent furnace having the controlled atmosphere of hydrogen and nitrogen.

The Selas-type direct-fired furnace may either be connected to a subsequent cooling section having a hydrogen and nitrogen atmosphere, or it may be connected to a subsequent furnace for further heating in a hydrogen and nitrogen atmosphere followed by cooling and/or holding. In either event, this is followed by a coating section, and the strip is brought approximately to the bath temperature and conducted beneath the level of the molten coating metal bath while still surrounded by the protective hydrogen-nitrogen atmosphere. The coating and finishing are carried out by any conventional method.

The process of the present invention is applicable to the second above-described type of Selas method, i.e. wherein a subsequent reducing furnace is provided, preferably of vertical configuration.

It has previously been considered essential that the strip leaving the direct-fired furnace be bright and nonoxidized in order to obtain satisfactory coating quality, in the conventional Selas-type process. This is effected by maintaining at least about 3% excess combustibles in the furnace atmosphere, and by controlling the maximum strip temperature relative to the thickness of the strip and the furnace temperature, so as to insure that no trace of oxidation occurs on the surface of the strip material.

While the Selas-type method has the above-mentioned advantages over the older Sendzimir method, nevertheless the Selas-type method does not realize optimum combustion efficiency and optimum production rate.

SUMMARY

It is a principal object of the present invention to provide a method for the preliminary treatment of carbon steel strip and sheet which obtains optimum combustion efficiency and optimum production rate, while taking full advantage of combined direct-fired and reducing furnace capabilities to meet commercial quality and drawing quality annealing cycle requirements. The present invention achieves this objective while still retaining most of the advantages of the Selas-type method over the Sendzimir method.

It has been discovered that carbon steel strip and sheet surfaces can be slightly oxidized in a Selas-type direct-fired preheat furnace, and the thin iron oxide film so formed can be removed in the subsequent hydrogen and nitrogen atmosphere prior to coating if at least 5% hydrogen by volume is present in the atmosphere of the subsequent furnace and if strip temperatures reached in the reducing furnace are at least about 675° C (1250° F). This in turn has made it possible to operate the direct-fired furnace at stoichiometrically equivalent fuel air ratios, or even with a slight excess of air, thereby achieving optimum combustion efficiency and increasing furnace heat input. More specifically, it has been found that an iron oxide film of controlled thickness, which can readily be reduced to a bright iron surface in a subsequent furnace having an atmosphere containing at least 5% hydrogen by volume, can be obtained by subjecting the strip to heating in a direct-fired furnace having an atmosphere ranging from about 3% excess oxygen to about 2% excess combustibles by volume within the temperature range of about 1000° F to about 1300° F (540° C to 705° C).

Although the oxide film thickness obtained in the practice of the present invention has not been precisely measured, these film thicknesses may be defined as being substantially less than those formed in the Sendzimir method and have been found to be so light as to have substantially no effect on the furnace atmosphere dew point when the films are subsequently reduced.

BRIEF DESCRIPTION OF THE DRAWINGS

Reference is made to the accompanying drawings wherein.

DESCRIPTION OF THE PREFERRED EMBODIMENTS

An indicated above, in its broad aspect the process of the invention comprises heating carbon steel strip and sheet in an atmosphere containing from about 3% excess oxygen to about 2% excess combustibles, then reducing this oxide film in a subsequent furnace having an atmosphere containing at least about 5% hydrogen. Preferably the atmosphere in the direct-fired preheat furnace contain 0% oxygen and 0% excess combustibles, i.e. stoichiometric combustion, and the subsequent furnace preferably contains at least about 15% hydrogen by volume with the balance substantially nitrogen, although up to 100% hydrogen may be used.

The temperature above which carbon steel will become oxidized, i.e. the critical strip temperature, is variable depending upon the percentage of excess combustibles, the preheat furnace temperature and the strip thickness. It will of course be recognized that the strip thickness affects the dwell time required to reach a given temperature.

Figure 1:
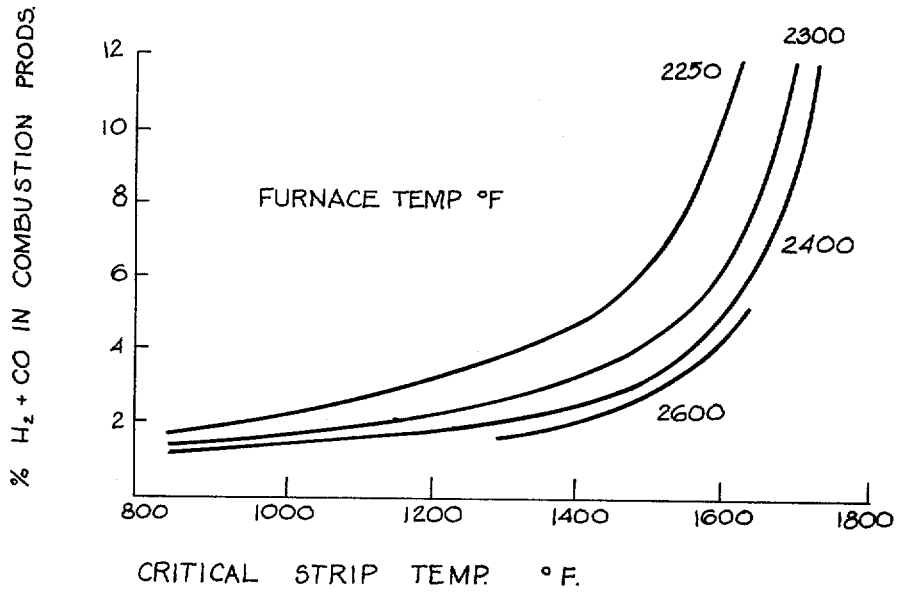
FIG. 1 is a graphic representation of the influence of combustion ratio and furnace temperature on the critical strip temperature of 24 gauge carbon steel strip.
Figure 2:
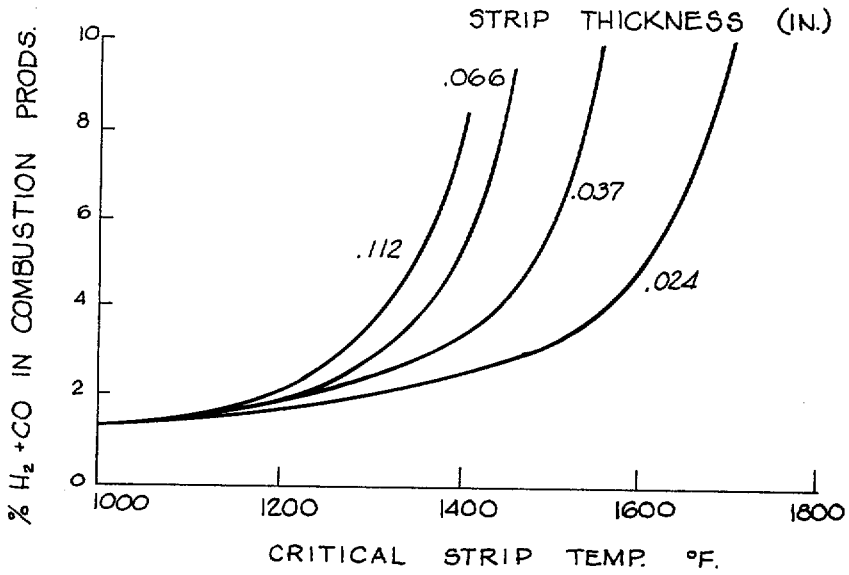
FIG. 2 is a graphic representation of the influence of strip thickness and combustion ratio on the critical strip temperature in a furnace maintained at 2400° F (1315° C)

FIGS. 1 and 2 illustrate graphically the parameters for operation in a Selas-type furnace in order to heat without strip oxidation. These data were developed subsequent to issuance of the above-mentioned Turner patent and are based on laboratory studies and commonly used operating practices which do not conform to the disclosures of the Turner patent.

Reference is made to FIG. 1 from which it is evident that with a constant strip thickness and a constant percentage of excess combustibles, an increase in furnace temperature increases the critical strip temperature. With furnace temperatures ranging between 2250° F and 2400° F (1230° C and 1315° C), and about 2% excess combustibles, the critical strip temperature ranges between about 950° F and 1300° F (510° C and 705° C) for 0.024 inch thick strip.

Reference is next made to FIG. 2. Assuming a constant furnace temperature and a constant percentage of excess combustibles a decrease in strip thickness increases the critical strip temperature. With a 2400° F (1315° C) furnace temperature and about 2% excess combustibles, strip thickness variations from about 0.024 inch to 0.112 inch exhibit critical temperatures ranging from about 1300° F (705° C) down to about 1200° F (650° C), respectively.

Figure 3:
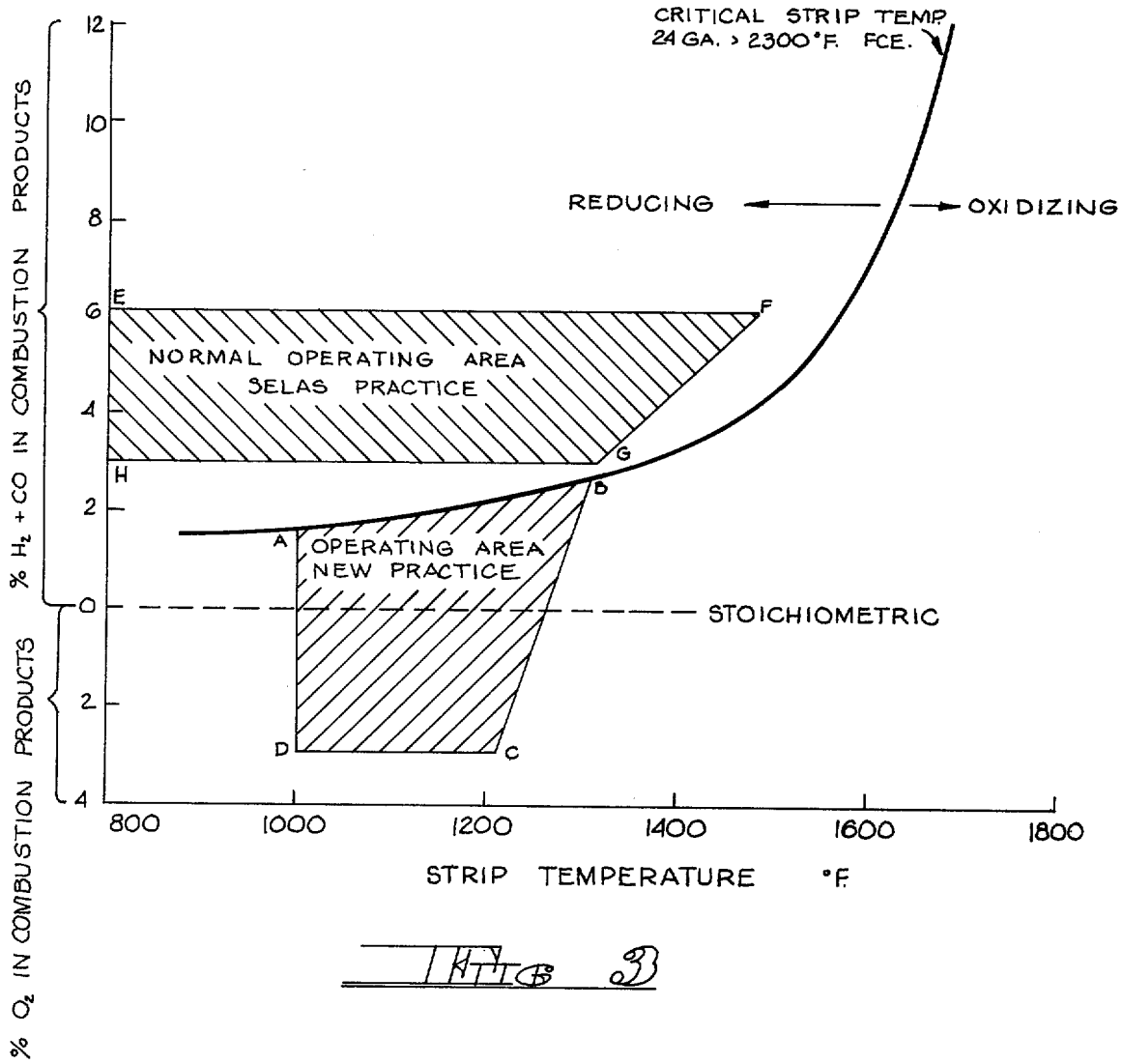
FIG. 3 is a graphic representation of the conventional operating practice in Selas-type furnaces contrasted to the method of this invention in terms of the critical strip temperature relation for 24 gauge strip in a furnace maintained at 2300° F (1260° C).

Finally, reference is made to FIG. 3, from which it will be noted that with a constant furnace temperature and strip thickness, an increase in the percentage of combustibles increases the critical strip temperature. At a furnace temperature of 2300° F (1260° C) and a 24 gauge strip thickness the critical strip temperature ranges from about 1000° F (540° C) for 1.5% excess combustibles to about 1300° F (705° C) for about 2.5% excess combustibles.

In FIG. 3 the area A B C D defines the operative parameters of the process of the present invention, whereas the area E F G H indicates the operating conditions for conventional Selas-type installations, as practiced in the prior art. It will be noted that at a furnace temperature of 2300° F (1260° C) strip of 24 gauge thickness can be heated to a temperature between about 1000° F and about 1300° F (540° C and 705° C) in an atmosphere ranging from about 3% oxygen to about 2% excess combustibles, and these limits define safe operating conditions for current mill practices.

For heavier gauge strip, or lower furnace temperatures, maximum temperatures may be slightly lower to avoid formation of unreducible oxide film thicknesses. The process of the present invention thus involves operating on the oxidizing side of the critical strip temperature curve of FIG. 3 (within the range of about 1000° F to about 1300° F) by control of the preheat furnace atmosphere to contain not more than about 2% excess combustibles. Preferably, the temperature at which the strip exits the preheat furnace is maintained between about 1100° F and about 1200° F (595° C to 650° C). In the subsequent reducing furnace the strip may be heated to the range of about 1250° F to about 1650° F (675° C to 900° C).

Apparatus adapted to carry out the process of the invention comprises a direct-fired furnace, a radiant tube furnace, preferably of vertical configuration, a cooling furnace and a metal coating pot. Operation of the direct-fired furnace at 0% excess combustibles and at about 2300° F (1260° C) resulted in a fuel savings of about 6% to about 10% per ton of coated product, in an experimental run.

Exemplary routings for various grades of coated products are as follows:

| Preheat Furnace (2300° F) | | | Reducing Furnace | |
|---|---|---|---|---|
| Strip Temp. After Preheater | % Combustibles | % Excess $O_2$ | % $H_2$ | Maximum Strip Temp |
| | Commercial Quality-Zn Coating | | | |
| 1100F | 0 | 0 | 15 | 1300F |
| | Drawing Quality-Zn Coating | | | |
| 1200F | 0 | 0 | 15 | 1450F |
| | Non-Earring (Normalized) Quality | | | |
| 1250F | 0 | 0 | 15 | 1650F |

Maximum preheat strip temperatures above those defined by the line BC of FIG. 3 are to be considered critical from the standpoint of safe commercial practice, since heating above these temperatures in corresponding atmosphere shown in FIG. 3 may result in formation of a relatively thick oxide scale which cannot be removed adequately in the subsequent reducing furnace. Heavier gauge strip may require slightly lower maximum strip temperatures than those indicated by line BC of FIG. 3.

It will be apparent that modifications may be made in the exemplary procedures set forth above without departing from the spirit and scope of the invention. Thus, various coating metals may be used, i.e., zinc, zinc alloys, aluminum, aluminum alloys and terne, and including those disclosed in U.S. Pat. No. 2,784,122 issued Mar. 5, 1957 to N. Cox et al. colume 2, lines 9–33, and in U.S. Pat. No. 2,839,455, issued June 17, 1958 to H. LaTour et al, at column 1, lines 68–71 and column 2, lines 1–7. The disclosure of these patents are incorporated herein by reference.

The embodiments of the invention in which an exclusive property of privilege is claimed are defined as follows:

1. A method of preparing carbon steel strip and sheet for fluxless hot dip metallic coating, comprising the steps of heating said strip and sheet in a furnace heated by direct combustion of fuel and air therein and [in an atmosphere containing from about 3% by volume oxygen to about 2% by volume excess combustibles in the form of hydrogen and carbon monoxide] *operated at fuel air ratios ranging from stoichiometrically equivalent to 3% by volume oxygen,* controlling the strip and sheet temperature within the range of about 540° to about 705° C, and thereafter heating said strip and sheet in a subsequent furnace containing at least about 5% hydrogen by volume and balance substantially nitrogen to a temperature of at least about 675° C.

[2. The method claimed in claim 1, wherein the atmosphere in said furnace heated by direct combustion of fuel and air contains 0% oxygen and 0% excess combustibles.]

3. The method claimed in claim 2, wherein the strip temperature exiting said furnace heated by direct combustion of fuel and air ranges from about 595° to about 650° C.

4. The method claimed in claim 1, wherein the strip temperature exiting said subsequent furnace ranges from about 675° to about 900° C.

5. The method claimed in claim 1, wherein the atmosphere of said subsequent furnace contains at least about 15% hydrogen.

6. In a method of fluxless hot dip metallic coating of carbon steel strip and sheet wherein the strip and sheet surface is prepared for coating by a preliminary treatment involving heating in a furnace heated by direct combustion of fuel and air therein and in an atmosphere containing gaseous products of combustion, followed by further treatment under conditions reducing to iron oxide, the improvement which comprises [conducting said heating in an atmosphere containing from about 3% oxygen by volume to about 2% hydrogen plus carbon monoxide by volume] *operating said furnace at fuel air ratios ranging from stoichiometrically equivalent to about 3% by volume oxygen,* at a temperature above the temperature at which said strip and sheet is oxidized and within the range of about 540° to about 705° C, whereby to produce an iron oxide film of controlled thickness, and conducting said further treatment in a subsequent furnace containing at least about [5%] *15%* hydrogen by volume at a temperature sufficient to reduce any oxide present on the strip and sheet as it exits said direct fired furnace.

[7. The improvement claimed in claim 6, wherein said atmosphere in said furnace heated by direct combustion of fuel and air contains 0% oxygen and 0% hydrogen plus carbon monoxide.]

[8. The improvement claimed in claim 6, wherein the strip and sheet is heated in said furnace heated by direct combustion of fuel and air to a temperature of about 540° to about 705° C.]

[9. The improvement claimed in claim 6, wherein the atmosphere in said subsequent furnace contains at least about 15% hydrogen and balance substantially nitrogen.]

10. The improvement claimed in claim 6, wherein the strip is heated in said subsequent furnace to a temperature of about 675° to about 900° C.

11. The improvement claimed in claim 6, wherein the coating metal is chosen from the class consisting of zinc, zinc alloys, aluminum, aluminum alloys and terne.

* * * * *